(12) United States Patent
Paterson

(10) Patent No.: US 12,024,036 B2
(45) Date of Patent: Jul. 2, 2024

(54) ELECTRIC VEHICLE AUTOMATIC CHARGING STATION

(71) Applicant: Scott Paterson, Demascus, VA (US)

(72) Inventor: Scott Paterson, Demascus, VA (US)

( * ) Notice: Subject to any disclaimer, the term of this patent is extended or adjusted under 35 U.S.C. 154(b) by 517 days.

(21) Appl. No.: 17/333,220

(22) Filed: May 28, 2021

(65) Prior Publication Data

US 2022/0258630 A1 Aug. 18, 2022

Related U.S. Application Data

(60) Provisional application No. 63/149,457, filed on Feb. 15, 2021.

(51) Int. Cl.
| | | |
|---|---|---|
| *B60L 53/18* | (2019.01) | |
| *B60L 53/30* | (2019.01) | |
| *B60L 53/35* | (2019.01) | |
| *B60L 53/65* | (2019.01) | |
| *B60L 53/66* | (2019.01) | |

(52) U.S. Cl.
CPC .............. *B60L 53/18* (2019.02); *B60L 53/305* (2019.02); *B60L 53/35* (2019.02); *B60L 53/65* (2019.02); *B60L 53/665* (2019.02)

(58) Field of Classification Search
CPC ...................................................... B60L 53/18
See application file for complete search history.

(56) References Cited

U.S. PATENT DOCUMENTS

| | | | | |
|---|---|---|---|---|
| 5,231,870 A | * | 8/1993 | Fukuda | G01M 17/0074 73/116.08 |
| 2003/0030411 A1 | * | 2/2003 | Ayano | B60L 3/00 320/109 |
| 2009/0287578 A1 | * | 11/2009 | Paluszek | G06Q 20/204 705/17 |
| 2016/0023565 A1 | * | 1/2016 | Bell | B60L 53/36 320/108 |

* cited by examiner

*Primary Examiner* — Robert Grant
(74) *Attorney, Agent, or Firm* — Brennan, Manna & Diamond, LLC

(57) ABSTRACT

This present invention relates to an automated electric vehicle charging system that eliminates the need to locate a cord and plug the cord into the receptacle and/or battery outlet. The electric vehicle automatic charging system comprises a wall-mounted or self-standing charging unit and several charging receptacles housed adjacent a tire track to transfer electricity from the charging unit to the vehicle for re-charging the vehicle's battery. The electric vehicle automatic charging system further comprises spring-loaded and weatherproof plastic covers for the receptacles to protect the receptacle from being damaged when the system is not in use.

10 Claims, 8 Drawing Sheets

ELECTRIC VEHICLE AUTOMATIC CHARGING STATION

CROSS-REFERENCE TO RELATED APPLICATION

The present application claims priority to, and the benefit of, U.S. Provisional Application No. 63/149,457, which was filed on Feb. 15, 2021 and is incorporated herein by reference in its entirety.

FIELD OF THE INVENTION

The present invention relates generally to the field of electric vehicle charging stations. More specifically, the present invention relates to an automated electric vehicle charging station comprising a floor-mounted docking station with an adjustable tire track guide and tire stops to ensure that the electric vehicle remains stable on the tire track and in proper position during the charging session. The automatic charging station further comprises a wall-mounted charging unit and several charging receptacles housed under the tire track to transfer 120 or 220 volt electrical current to the docked vehicle to charge the vehicle's battery or batteries. Additionally, the docking station features a scissor-adjusting configuration to accommodate different makes and models of electric vehicles which have differing vehicle widths and tire widths. The automatic charging station of the present invention offers a convenient and safe method for automatically charging an electric vehicle. Accordingly, the present specification makes specific reference thereto. However, it is to be appreciated that aspects of the present invention are also equally amenable to other like applications.

BACKGROUND OF THE INVENTION

By the way of background, low-energy consuming and minimum-pollution causing electric vehicles or "EVs" are expected to become the primary mode of personal transportation in the immediate future. EVs help to overcome or at least combat the serious consequences of pollution, global warming and the depletion of the earth's petroleum resources by conventional fossil fuel or petroleum-operated vehicles. More specifically, electric vehicles are propelled by electric motors and motor controllers instead of internal combustion engines for propulsion, and generally store chemical and electrical energy in a rechargeable battery pack. An electric vehicle may be either a battery only electric vehicle (otherwise known as an all-electric vehicle), or may be a hybrid vehicle which uses a combination of an electric motor and an internal combustion engine. Hybrid vehicles have a battery that may be externally recharged, or may have a battery that is internally recharged with power from an internal combustion engine power and gasoline fuel. Hybrid vehicles run as battery electric vehicles during their charge-depleting mode and may also use the internal combustion engine to operate during start up, cold weather, steep inclines or other situations where the electric motor may not provide sufficient motive force to propel the vehicle.

Typically, current methods of charging an electric vehicle require using a handheld charger receptacle. More specifically, the electric vehicle is charged by connecting the vehicle to an electrical socket or receptacle through an extension cord. This process requires the user or operator to find a suitable charging cord, and then manually plug the charging cord into the socket or receptacle and the outlet of the electric vehicle. Once the battery of the vehicle is completely charged, the cord must be unplugged from the vehicle and stored. Plugging and unplugging the vehicle into the receptacle can be both frustrating and time-consuming, particularly if the user from the last charging session did not properly store the power cord. Additionally, while physically touching the electrical cords and connecting the cord to the socket or vehicle battery, there is always a risk of the user receiving an electrical shock, which makes the standard electric vehicle charging method potentially dangerous and unsafe for the user. Further, while manually plugging in the cord, the hands and clothes of the user may get dirty from oil and other debris that may have collected on the vehicle body during its operation.

Further, current charging methods can be time-consuming (typically taking hours to completely recharge the battery), and some individuals may consider it to be much faster to pump gasoline rather than wait for an electric vehicle to charge, or wait for a charging station to become available. Nonetheless, many individuals desire to be more environmentally conscious when purchasing a vehicle, and may therefore desire to overlook some of the current shortcomings associated with electric vehicles and current charging solutions.

Therefore, there exists a long felt need in the art for charging station that enables a user to quickly and conveniently charge an electric vehicle. There also exists a long felt need in the art for a no-touch charging station for an electric vehicle that eliminates the need for the operator to have to search for an appropriate charging cord, and then manually plug and unplug the cord thereby exposing the operator dirt, grease and the potential for receiving an electric shock. Moreover, there is a long felt need in the art for an automated charging station that is adjustable in size and orientation to accommodate a wide array of electric vehicles, each having different wheelbase dimensions. Finally, there is a long felt need in the art for an automated electric vehicle charging station that is relatively inexpensive to manufacture and that is both safe and easy to use.

The subject matter disclosed and claimed herein, in one embodiment thereof, comprises an automated electric vehicle charging system comprising a wall-mounted charging unit, a floor mounted docking station, an adjustable tire track guide and a plurality of tire stops. The charging station further comprises a plurality of charging receptacles that are housed under the tire track to transfer electricity to the electrical vehicle for charging the electric vehicle's battery. A mirror or a rotating camera system is used to help the driver guide the electric vehicle onto the floor-mounted docking station. The automated electric vehicle charging system further utilizes several spring-loaded, weatherproof plastic covers to protect the system, automatically opening when a vehicle is driven onto the track guides and then closing when the charging station is not in use.

In this manner, the electric vehicle automatic charging station of the present invention accomplishes all of the forgoing objectives, and provides a convenient, quick and efficient solution for charging electric vehicles. The electric vehicle charging station of the present invention is designed with a variety of operational and control features that can be easily handled and operated automatically, thereby making the process of charging an electric vehicle a less time-consuming and a more convenient experience. Additionally, the electric vehicle automatic charging station is user-friendly as it eliminates the need to locate and then plug or unplug an electrical cord into both the electric vehicle and an outlet, thereby preventing the hands and clothes of the user from getting dirty while accomplishing the same.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an automated charging system for electric vehicles. The system includes a charging unit, a floor-mounted docking station, a scissor-adjusting means to accommodate different makes and models of vehicles having different widths or wheel bases, and adjustable tire track guide and tire stop to ensure the vehicle remains stable on the system while charging. A hose is provided to accommodate electric wiring, and a receptacle is provided to connect the charging unit to the vehicle outlet. An indicator light is used to indicate if a connection is successfully made, and a plurality of mirrors or a rotating camera are provided to assist the driver in guiding their vehicle onto the docking station. The automated charging system further utilizes several spring-loaded, weatherproof plastic covers over the receptacle to protect the system, where the cover automatically opens when a vehicle is driving onto the guides, and closes when the docking station is not in use.

In another preferred embodiment of the present invention, a method of automatically charging electric vehicles using an automatic electric vehicle charging station is disclosed. The method comprises the steps of a user initially driving a vehicle onto the track guide of a docking station in a stable position and then automatically plugging the vehicle outlet into a receptacle which connects a charging unit for transferring electricity to a battery of the vehicle. Next, a battery level is selected as per the charging requirement of the vehicle. As per the selected input, the vehicle battery is charged up to the selected battery level requirements, and the user is notified when the vehicle battery is charged to the desired level. The user may then remove the vehicle from the charging station. The electric vehicle automatic charging system functions as a "park and walk away" design which allows owners the significant convenience of driving onto a charging station and then walking away while the charging station charges the vehicle.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
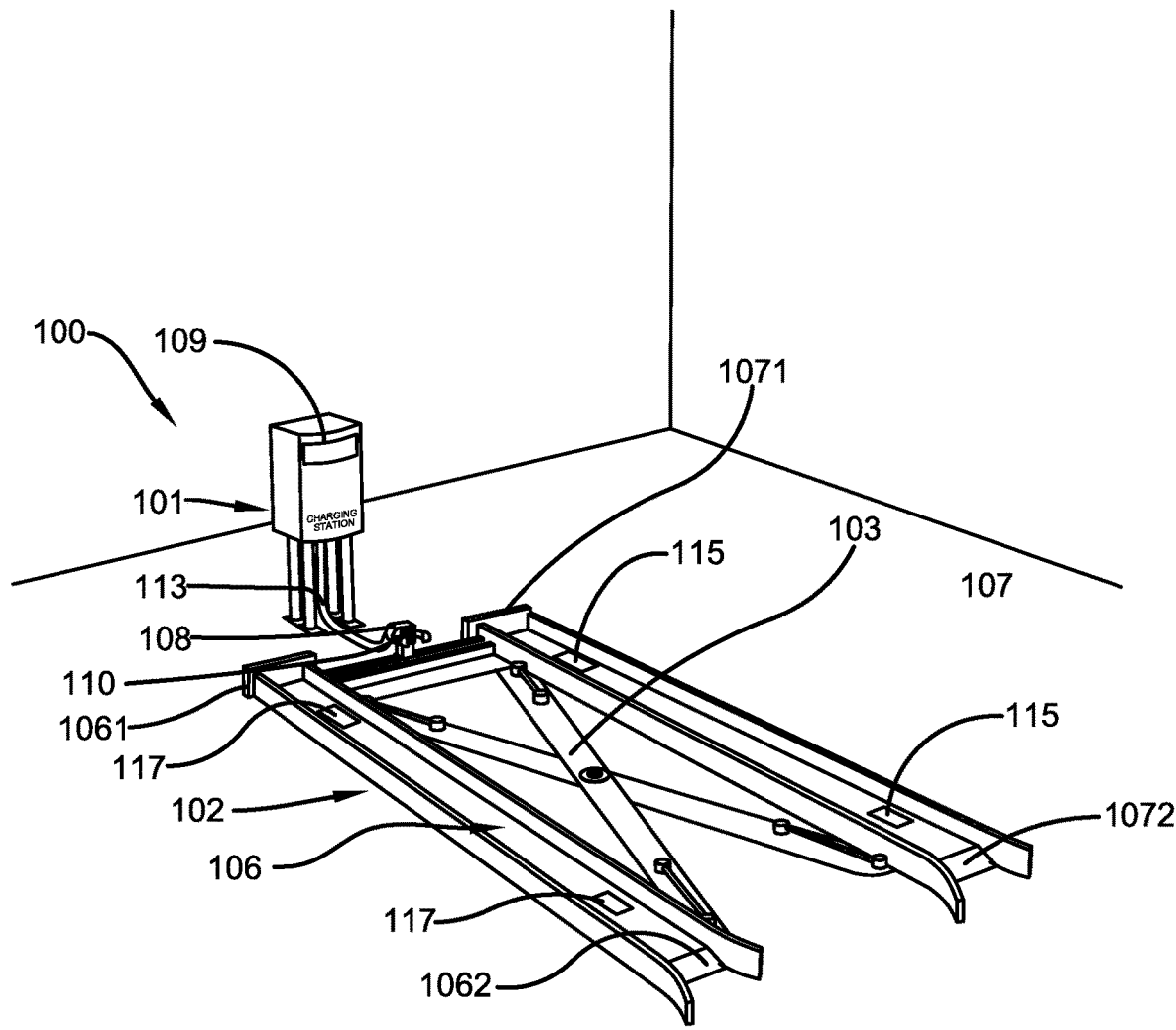
FIG. 1 illustrates a perspective view of one potential embodiment of an automatic electric vehicle charging station of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a quick and convenient method of charging an electric vehicle. There also exists a long felt need in the art for providing users with a no-touch charging ability for an electric vehicle, which releases the operator of the vehicle from the hassle of finding a cord and plugging the cord into the socket. There is also a long felt need in the art for eliminating the need for electrical vehicle owners to manually charge and remain with their vehicle, thereby saving extensive amounts of time. Additionally, there is a long felt need in the art for providing users with a safe electric vehicle charging method which eliminates the need to physically touch and/or plug in the electrical wires. Further, there is a long felt need in the art for providing users with a method of charging an electric vehicle which prevents the clothes and hands of the users from coming into contact with grease and road debris which may accumulate on the vehicle body. Finally, there is a long felt need in the art for providing users with an easy, quick and automated method of charging electric vehicles.

The present invention, in one exemplary embodiment, is a novel automated charging system for electric vehicles or EVs, and is comprised of a charging unit, a floor-mounted docking station, a scissor-adjusting device to accommodate different makes and models of vehicles, widths or wheel base dimensions and an adjustable tire track guide and tire stop to ensure the vehicle remains stable on the system while charging. A hose is provided to enclose and protect electric wiring, and a receptacle is used to connect the charging unit to the vehicle outlet. An indicator light indicates if a connection has been successfully made, and one or more mirrors or rotating cameras are available to assist the driver in guiding their vehicle onto the docking station. The automated charging system further utilizes several spring-loaded, weatherproof plastic covers over the receptacle to protect the system, and the cover automatically opens when a vehicle is driving onto the guides, and closes when the vehicle leaves the charging station.

Referring initially to the drawings, FIG. 1 illustrates a perspective view of one potential embodiment of an automatic electric vehicle charging station 100 of the present invention in accordance with the disclosed architecture. Generally stated, the automatic electric vehicle automatic charging station 100 is comprised of a charging unit 101, a floor-mounted docking station 102, a flexible hose 113 and a receptacle 108. The charging unit 101 may be a wall-mounted or self-standing pedestal-type equipment that allows for charging of electric vehicles by transferring 120- to 220-volt electricity to the vehicle through the receptacle 108. The receptacle 108 connects the charging unit 101 through an extended flexible hose 113 that encloses internal wiring (not shown) to allow the electricity to be transferred from the charging unit 101 to the receptacle 108. The charging unit 101 includes an information display 109 for displaying data such as charging connection status, battery level, waiting time for charging, and more The display can be an analog or digital display, or a combination of analog and digital elements.

The receptacle or charging unit 108 can be housed under or between the tire tracks and may be protected via a spring-loaded and weatherproof plastic cover 111. The receptacle or charging unit is generally centrally-disposed of the docking station so that it can readily engage the charging ports of the vehicle, once the vehicle is in position on the docking station. Usually, the spring-loaded and weatherproof plastic cover 111 acts as a shield to the opening of the receptacle 108, and protects the receptacle or charging unit 108 from being damaged due to moisture, rain, dirt, ice buildup, debris or other reasons, when the receptacle or charging unit is not in use. The cover 111 automatically opens when a vehicle drives onto the docking station 102, and enables the receptacle or charging unit 108 to be used for charging the electric vehicle docked on the docking station 102.

The floor-mounted docking station 102 has first and second tire track guides 106, 107 for providing a guide or runway for docking the vehicle. The driver of the vehicle docks the vehicle on the docking station 102 in a manner such that the left side tires of the vehicle are positioned in the left tire track guide 106, and the right side tires of the vehicle are positioned in the right tire track guide 107. The tire track guides 106 and 107 have a small ramp 1062 and 1072 respectively, to enable the vehicle to easily ride up into the guides 106 and 107. Once the vehicle reaches an appropriate position to allow connection to the receptacle or charging unit 108, tire stoppers or a break 1061 and 1071 ensure the electric vehicle remains stable on the docking station 102 during charging. Additionally, the docking station 102 features a scissor-adjusting device 103 to enable the docking station 102 to accommodate different wheel bases or widths that various makes and models of vehicles may have, and to move upwards and downwards. Each of the left and right tire guides may also include tire sensors 115 and 117, so that the docking station can determine when the vehicle is in position within the docking station.

Figure 2:
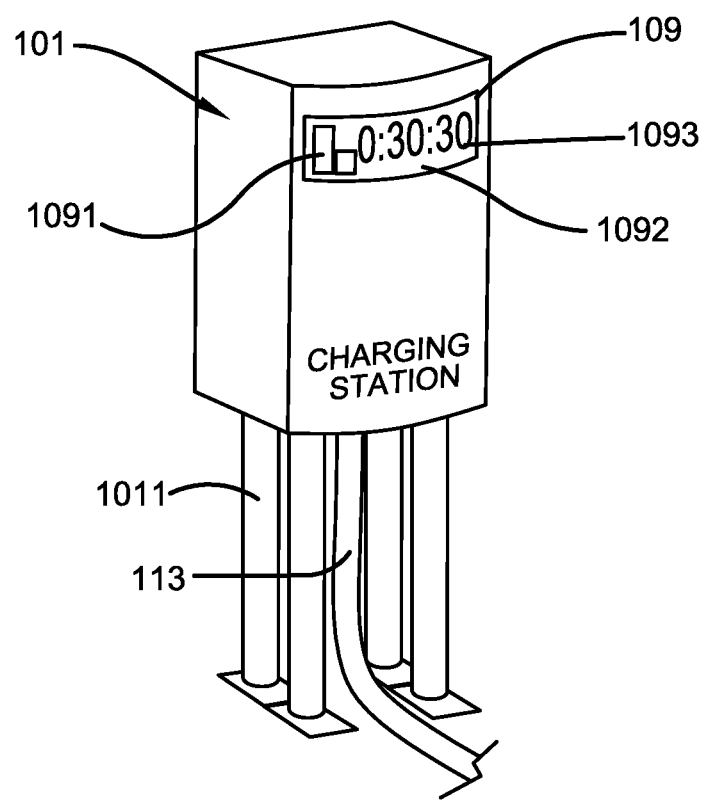
FIG. 2 illustrates a perspective view of one potential embodiment of the charging station of the automatic electric vehicle charging station of the present invention in accordance with the disclosed architecture.

FIG. 2 illustrates a perspective view of one potential embodiment of the charging station 101 of the automatic electric vehicle charging station 100 of the present invention in accordance with the disclosed architecture. The charging unit 101 is a wall-mounted or a self-standing pedestal-style piece of equipment that provides electricity for charging the vehicles, and is repositionable in three dimensions. The charging unit 101 has an information display 109 to display various information such as connection status 1091, battery level indicator 1092, waiting time 1093 and more. The connection status 1091 shows if the connection between the vehicle outlet and the receptacle is properly done, and if vehicle charging is activated or not. The battery level indicator 1092 shows the percentage of vehicle battery charge. The waiting time 1093 shows the time left for fully charging the vehicle and may also display the time of day and the time the vehicle has been in the docking station. Other information may be available on the display, such as time to the next service appointment for the vehicle and other information that may be useful for the operator of the vehicle. The display may also include animation showing the charging of the vehicle and other indicators.

Figure 3:
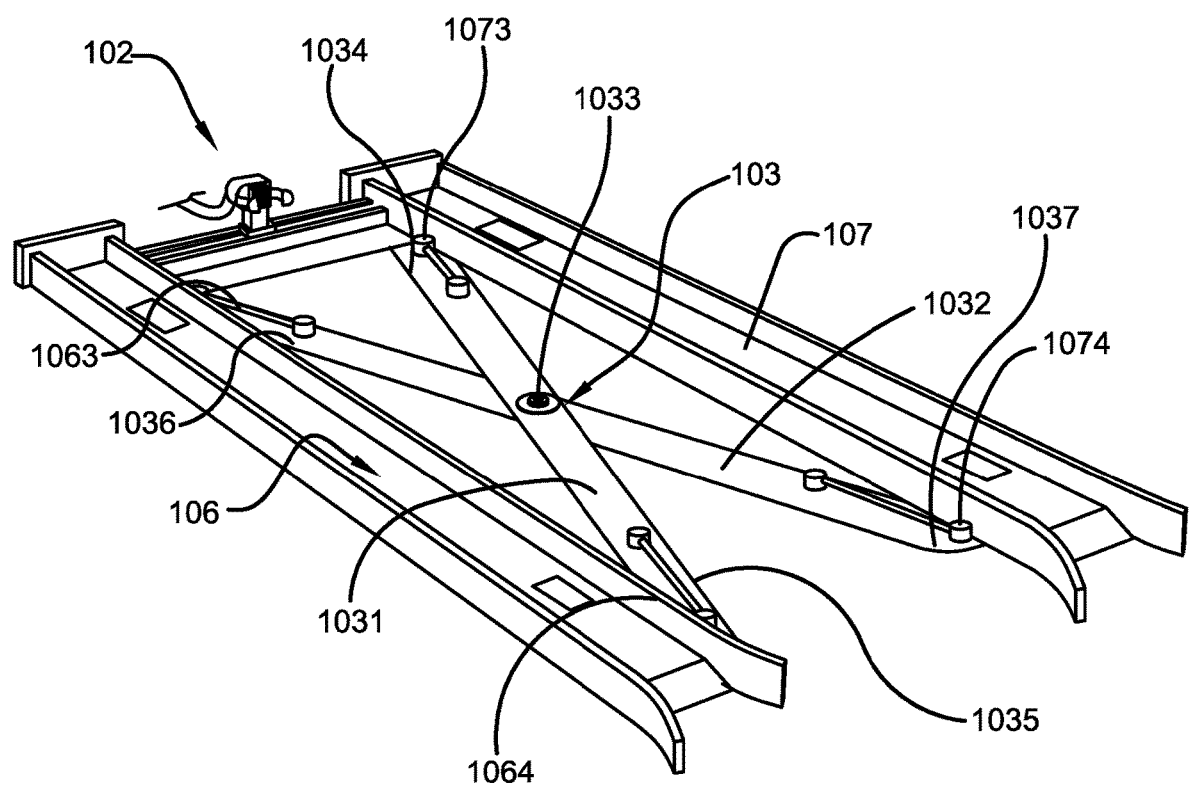
FIG. 3 illustrates a perspective view of one potential embodiment of the floor mounted docking station of the automatic electric vehicle charging station of the present invention in accordance with the disclosed architecture.

FIG. 3 illustrates a perspective view of one potential embodiment of the floor mounted docking station 102 of the automatic electric vehicle charging station 100 of the present invention in accordance with the disclosed architecture. The floor-mounted docking station 102 features a scissor-like adjusting device 103 to accommodate different wheelbases and vehicle widths, as well as different makes and models of electric vehicles. The scissor-like adjusting device 103 is an adjusting element designed in the manner of operating similarly to a pair of scissors. The docking station adjusting device comprises a first scissor arm 1031 and a second scissor arm 1032, wherein the first scissor arm 1031 crosses over the second scissor arm 1032 and the first and second scissor-like arms 1031, 1032 are pivotably connected at a connecting point 1033. Expansion of the arms then causes the width of the arms to expand.

The first scissor arm 1031 has a first end 1034 and a second end 1035, with the first end 1034 of the first arm 1031 connected at a first end 1073 of the right track guide 107, and the second end 1035 of the first arm 1031 connected at a second end 1064 of the left track guide 106. The second scissor arm 1032 has a first end 1036 and a second end 1037, with the first end 1036 of the second arm 1032 is connected at a first end 1063 of the left track guide 106, and the second end 1037 is connected at a second end 1074 of the right track guide 107.

Accordingly, the pivot movement of the arms 1031 and 1032, enables the track guides 106, 107 to move in a manner to extend the distance between the track guides 106, 107, and to accommodate large-sized vehicles. Alternatively, the pivot movement of the arms 1031 and 1032 may enable the track guides 106, 107 to move in a manner to decrease the distance between the track guides 106, 107, in order to accommodate small-sized vehicles. In this manner, the scissor adjusting means 103 enables the docking station 102 to accommodate makes and models of vehicles having different wheel base dimensions.

Figure 4:
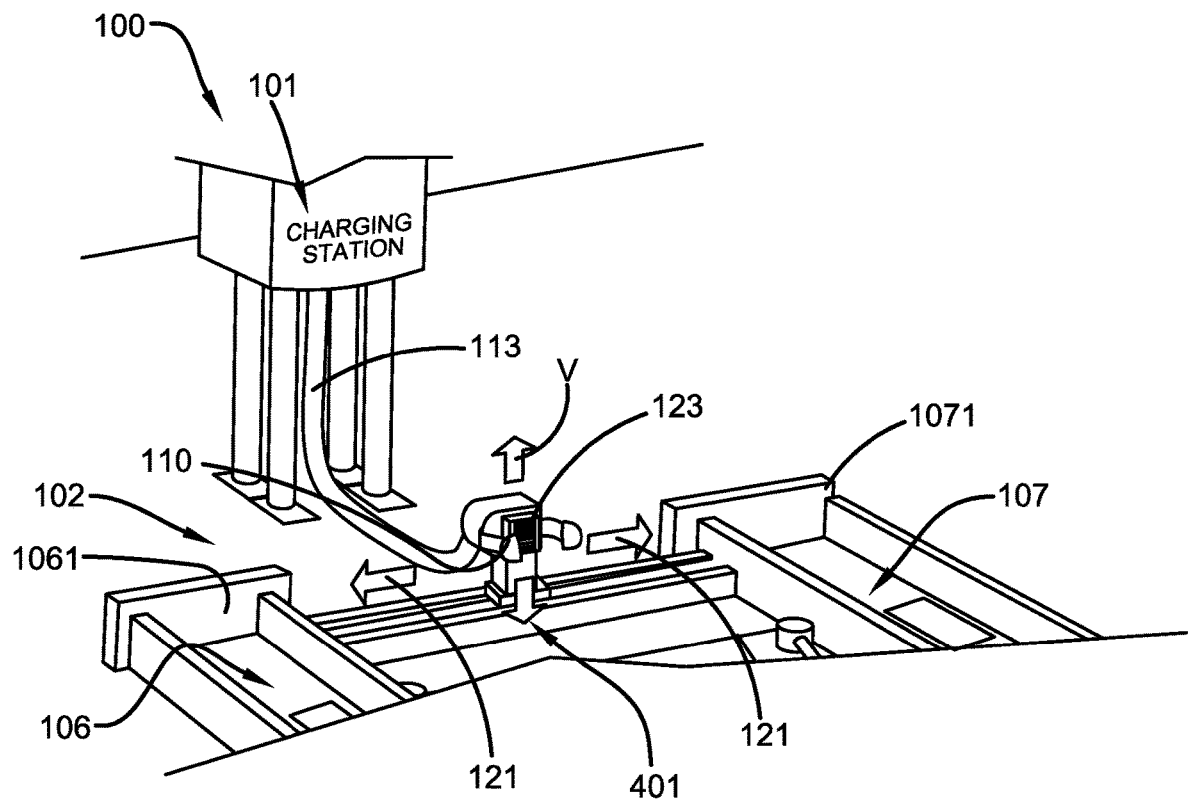
FIG. 4 illustrates a partial perspective view of one potential embodiment of the automatic electric vehicle charging station of the present invention in accordance with the disclosed architecture, wherein the adjustability of the floor mounted docking station is depicted.

FIG. 4 illustrates a partial perspective view of one potential embodiment of the automatic electric vehicle charging station 100 of the present invention in accordance with the disclosed architecture, wherein the adjustability of the floor mounted docking station 102 is depicted. As shown, the first and second scissor arms 1031, 1032 are pivotably moved in a manner such that the track guides 106 and 107 are pushed outwardly, and the connecting member 401 extends to increase the distance between the track guides 106 and 107. In this condition, large sized vehicles can be easily accommodated over the docking station 102 to charge the vehicle. The connecting member can extend in the transverse direction 121 or in the longitudinal direction 123 to meet the different wheel base dimensions of different vehicles, as well as up and down.

Figure 5:
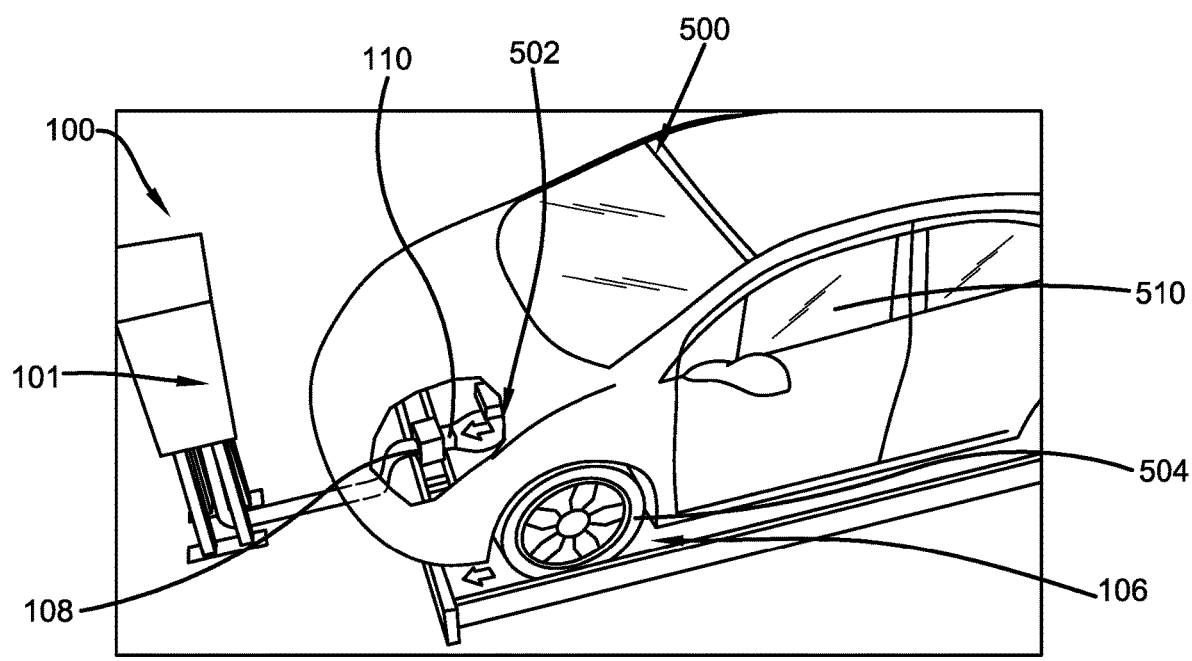
FIG. 5 illustrates a partial perspective view of one potential embodiment of the automatic electric vehicle charging station of the present invention in accordance with the disclosed architecture, wherein an electric vehicle is being driven onto the floor mounted docking station.

FIG. 5 illustrates a partial perspective view of one potential embodiment of the automatic electric vehicle charging station 100 of the present invention in accordance with the disclosed architecture, wherein an electric vehicle 500 is being driven onto the floor mounted docking station 102. As shown, a driver 510 of the vehicle 500 guides the vehicle 500 over the tracks 106, 107 of the docking station 102 of the automated charging station 100. While the vehicle 500 is being driven onto the tracks 106, 107, the receptacle or charging unit cover 110 automatically opens, thereby providing access to the receptacle 108 for charging the electric vehicle 500. Additionally and as best shown in FIG. 5, the left side tires 504 of the electric vehicle 500 are positioned on the left track guide 106 of the docking station 102. Similarly, the right side tires of the vehicle 500 are positioned on the right track guide 107 of the docking station 102.

Once the vehicle 500 is positioned in the desired charging position, the receptacle or charging unit 108 is plugged into the vehicle outlet 502, to transfer the electricity from the charging unit 101 to the battery of the vehicle 500. The connection status is shown if the vehicle outlet 502 and the receptacle 108 are properly connected, and can be viewed on the information display of the charging unit 101.

Figure 6:
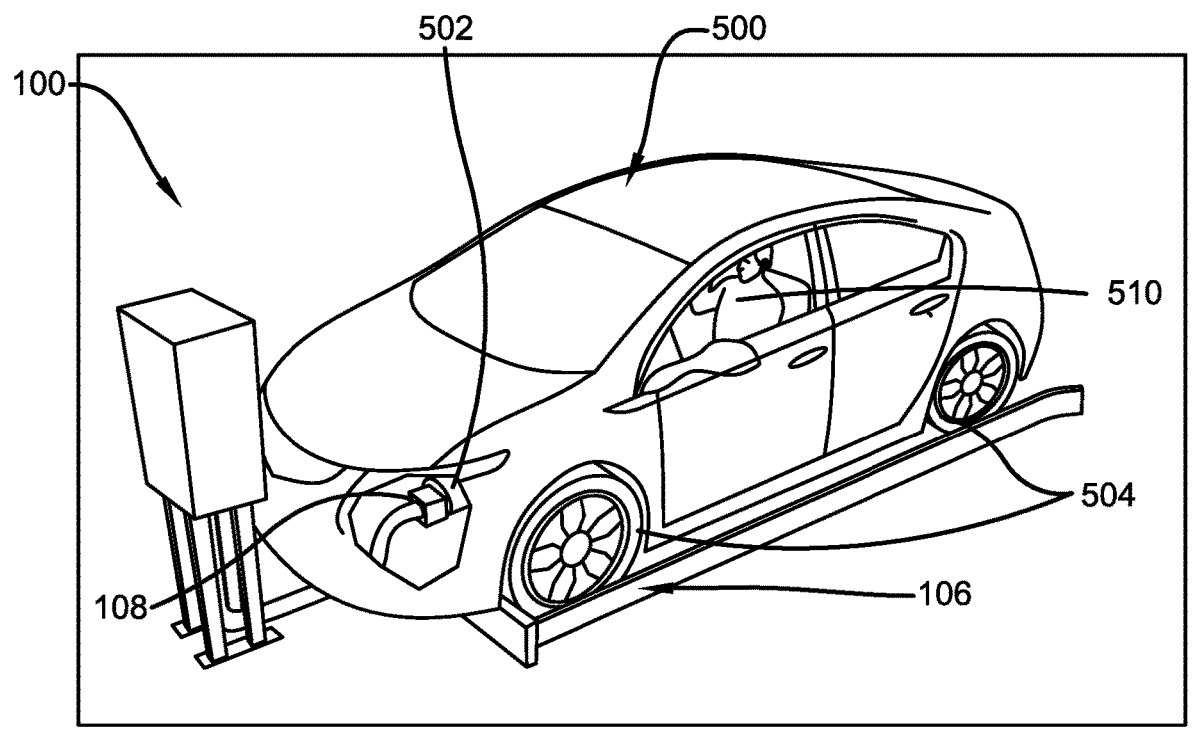
FIG. 6 illustrates a partial perspective view of one potential embodiment of the automatic electric vehicle charging station of the present invention in accordance with the disclosed architecture, wherein an electric vehicle is being automatically charged by the charging station while positioned on the floor mounted docking station.

FIG. 6 illustrates a partial perspective view of one potential embodiment of the automatic electric vehicle charging station 100 of the present invention in accordance with the disclosed architecture, wherein an electric vehicle 500 is being automatically charged by the charging station 101 while positioned on the floor mounted docking station 102. As shown, once the vehicle 500 is properly docked on the docking station 102 and the left side tires 504 are positioned over the left track guide 106, the receptacle 108 can then be plugged into the vehicle outlet 502 to provide an electrical connection between the charging unit 101 and the battery of the electric vehicle 500 so that the same can automatically be charged.

Using the present invention, a user can drive his or her vehicle 500 onto the docking station 102 of the charging system 100 and, once the vehicle 500 is properly docked in position to receive the charge, the vehicle 500 is automatically connected to the charging unit 101 for quick and efficient charging of the vehicle's battery. The automated charging system 100 functions as a "park and walk away" charging station which allows owners the significant convenience of being able to drive onto a charging station and then walk away while the charging station charges the vehicle 500.

In a preferred embodiment, the charging station 100 may further include an LED monitor with a camera or mirror affixed to help guide the driver onto the docking station 102 at a correct angle, such that the vehicle 500 is properly connected to the charging unit 101. Visual indica may include an "X" when the car is in position, or an arrow to notify the driver to move forward. Other symbols or words may be used as needed. Additionally, the scissor-adjusting means 103 of the docking station can be adjusted using a button on the system 100 or can be remotely manipulated to accommodate different wheel base dimensions for various makes and models of vehicles. For example, a smart app may be downloaded onto a smart phone and the vehicle operator can transmit make and model information to the charging station so that the docking station automatically adjusts prior to the operator entering the docking station. Alternatively, if there are multiple users, each user can have his or her own identification code to allow the system to be set to a specific dimension for that use. In this way, each user can also be invoiced for the number of charging sessions that each operator has engaged.

In yet another embodiment of the present invention, the automated charging system 100 may have a compatible software application for managing charging of the vehicle. The user may log in to the application and select an appropriate charging cycle based on the type of the electric vehicle 500, its battery and other information. The application may include owner information and payment methods for paying the amount for charging of the vehicle.

It can be observed that the present invention provides a unique solution to the problem of providing an automated electric vehicle charging station. A main advantage of the automated electric vehicle charging station 100 of the present invention is that it provides electric vehicle owners 500 with convenient, no-touch charging ability, which releases them from the hassle of finding a cord and plugging the cord into the receptacle and battery. Also, the automated charging method prevents the clothes and hands of the user from becoming dirty. The automated electric vehicle charging station 100 of the present invention saves considerable time and effort on the part of the users. Finally, the automated electric vehicle charging station 100 of the present invention is suitable for providing users with an advanced system and method which can be used to automatically charge electric vehicles of different makes and models.

In an embodiment of the present invention, the charging system 100 may have one or more receptacles. Also, the charging unit 101 may accommodate different levels of battery charging. For example, low, medium and high battery level charging is possible using the system 100. A user can manually or automatically set the battery charging level as per the requirements and compatibility of their vehicles. The charging unit 101 can be adapted to all smaller electric vehicles including, without limitation, construction equipment, 4×4 s, ATVs, sling shot vehicles, golf carts, lawn mowers, wheelchairs, and the like.

In yet a further embodiment, the automated electric vehicle charging station 100 of the present invention can also be equipped with a remote control mechanism so that automatic charging can be done more efficiently. By automating the process and the device, charging can be performed conveniently without manual efforts. For achieving further automation, the automated electric vehicle charging station 100 of the present invention can be made movable with the help of suitable tracks and moving means. In another preferred embodiment, suitable sensors can be attached with the automated electric vehicle charging station 100 of the present invention to automatically switch on and off the charging, by sensing the arrival of the vehicle 500 onto the docking station 102. Such sensors can be selected from, but are not limited to, pressure sensors, optical sensors, motion sensors, laser sensors, electromechanical sensors, etc.

It is obvious from the above discussion, that the automated electric vehicle charging station 100 of the present invention has extremely high working efficiency, and greatly saves manpower, material resources and financial resources. In addition, the automated electric vehicle charging station 100 also has the advantages of safety and reliability, easy mounting and disassembly and convenience to maintain. The automated electric vehicle charging station 100 of the present invention is particularly more useful in populated areas such as tourist places, office premises and market areas.

Figure 7:
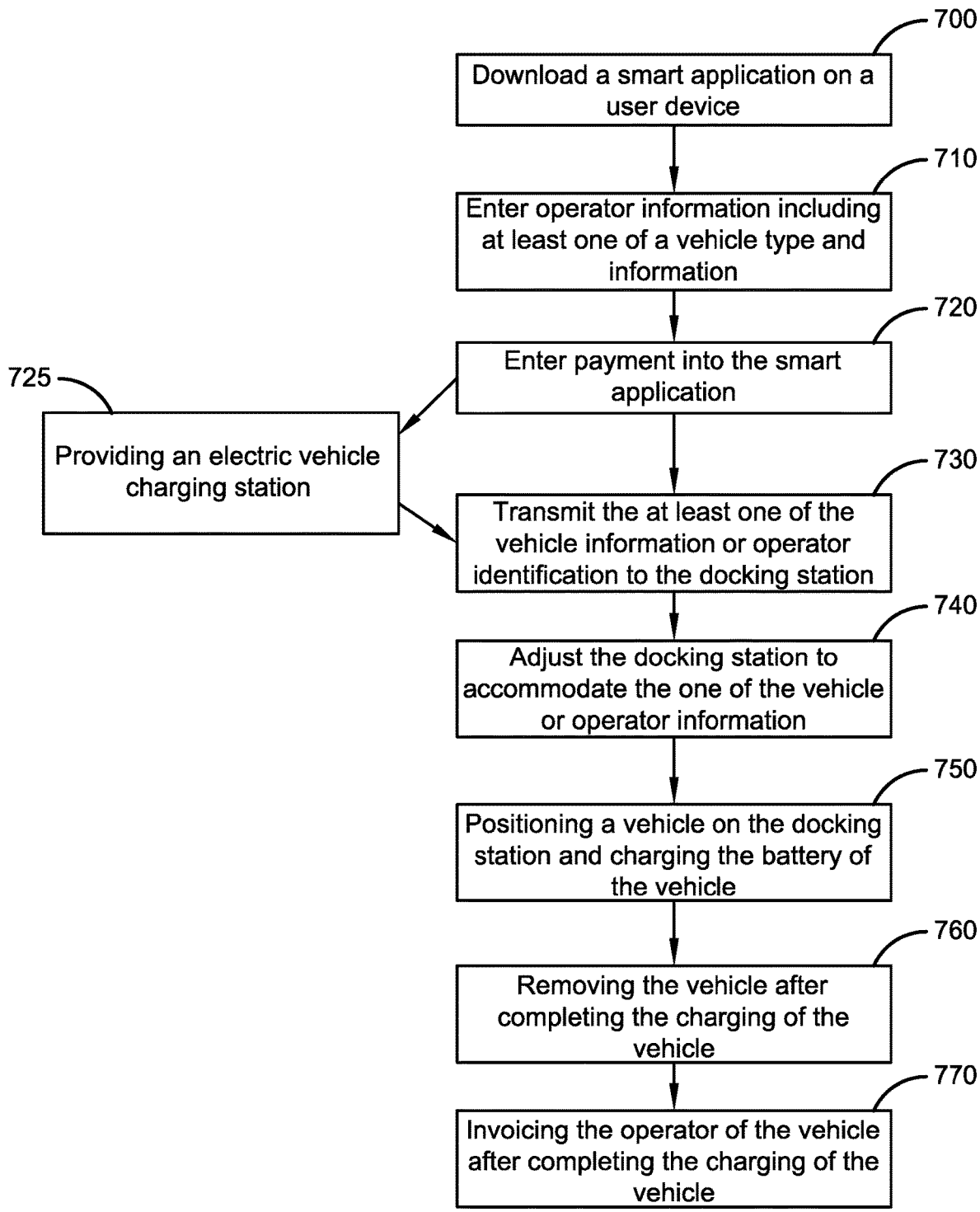
FIG. 7 illustrates a block diagram of one potential method of using the charging system of the present invention in accordance with the disclosed architecture.

FIG. 7 illustrates an exemplary block diagram of one potential method of using the docking station of the present invention, which begins at step 700 by downloading a smart application onto an electronic device of a user. At step 710, at least one of a vehicle type or operator information is entered into the smart application, and the user of the mobile application enters payment information at step 720, which may include credit card or banking information so that the charging station can invoice the user for the charging service as appropriate. An electric vehicle charging station is provided at step 725, and information is transmitted from the operator to the docking station relating to the vehicle or to the operator at step 730. After the information has been transmitted to the docking station, the tire guides are adjusted to accommodate the vehicle that has requested the charging service at step 740. Next, at step 750, the electric vehicle is positioned on the docking station, and the charging of the electric vehicle's battery is commenced. Once the charging is complete at step 760, the electric vehicle is removed from the docking station and, at step 770, the user of the docking station is invoiced for the charging session.

In a further embodiment, the charging station 100 can also use existing smart drive technology that will guide the electric vehicle onto and off of the charging station hands free. Additionally, the Charger receptacles are spring loaded for manual operation or may be electronically programmed to both open and close, which may be accomplished by electronic vehicle sensors that recognize proximity or weight. Finally, the on-board charger connector can be installed or retro-fitted to an existing electric vehicle using a cord, connectors and mounting hardware. The cord is simply connected to the battery hub that feeds the vehicle's current charging receptacle, wherein the cord will follow the existing wiring harnesses inside the electric vehicle. The charger receptacle can also be mounted to the undercarriage or the electric vehicle's front spoiler. In the future, electric vehicle manufacturers can make customized locations for the receptacle, thereby integrating it with their styling and design.

Figure 8A:
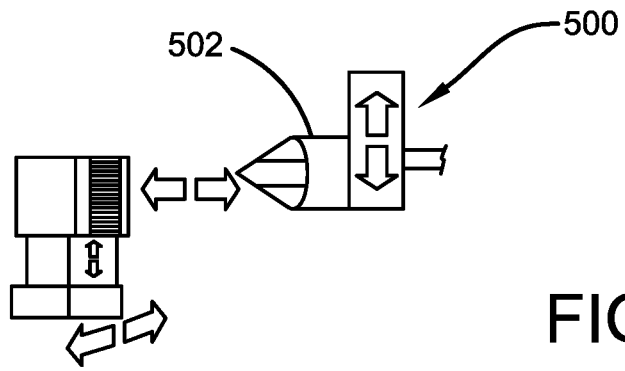
FIG. 8A illustrates a side perspective view of one potential embodiment of the connection between the charging station receptacle and the electric vehicle receptacle in accordance with the disclosed architecture.

FIG. 8A illustrates a side perspective view of one potential embodiment of the connection between the charging station receptacle and the electric vehicle receptacle in accordance with the disclosed architecture. As stated above, the charging station receptacle can be raised or lowered to mate with the electric vehicle receptacle.

Figure 8B:
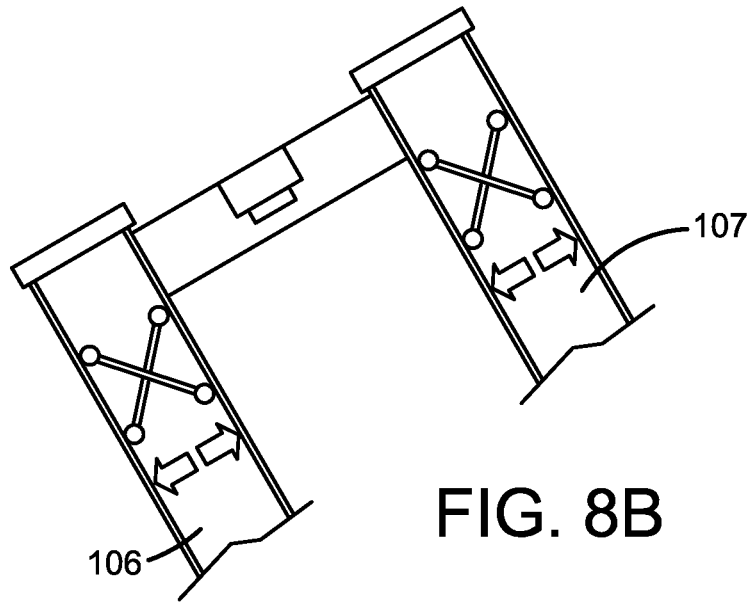
FIG. 8B illustrates a top partial perspective view of one potential embodiment of the track system of the electric vehicle charging station of the present invention in accordance with the disclosed architecture.
Figure 8C:
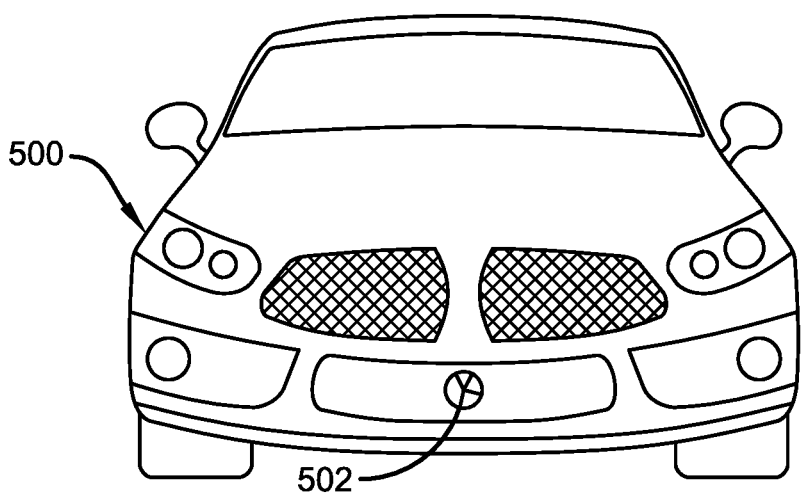
FIG. 8C illustrates a front partial perspective view of one potential embodiment of the bumper and charging receptacle of an electric vehicle.

FIG. 8B illustrates a top partial perspective view of one potential embodiment of the track system of the electric vehicle charging station 100 of the present invention in accordance with the disclosed architecture. As noted above, the left and right tire track guides 106, 107 are repositionable to accommodate many different sizes of wheel bases and are also contractable/expandable in width. FIG. 8C illustrates a front partial perspective view of one potential embodiment of the bumper and charging receptacle 502 of an electric vehicle 500.

As stated above, the charging monitor can be placed on a pedestal or be wall mounted. All components of the charging station unit are grounded, and can be equipped with GFI circuit breakers to prevent any potential electrical shock. The charger unit takes any voltage (i.e., multi voltage) electricity.

Certain terms are used throughout the following description and claim to refer to particular feature or component. As one skilled in the art will appreciate, different persons may refer to the same feature or component by different names. This document does not intend to distinguish between components or features that differ in name but not structure or function. As used herein "automated electric vehicle charging station", "automated charging station", "electric vehicle automatic charging station" and "charging station" are interchangeable and refer to the electric vehicle automatic charging station 100 of the present invention.

Notwithstanding the forgoing, the electric vehicle automatic charging station 100 of the present invention and its various structural components can be of any suitable size, shape, color, style and configuration as is known in the art without affecting the overall concept of the invention, provided that it accomplishes the above stated objectives. One of ordinary skill in the art will appreciate that the shape and size of the electric vehicle automatic charging station 100 and its various structural components, as shown in the FIGS., are for illustrative purposes only, and that many other shapes and sizes of the electric vehicle automatic charging station 100 are well within the scope of the present disclosure. Although the dimensions of the electric vehicle automatic charging station 100 and its various structural components i.e., length, width, and height are important design parameters for good performance, the electric vehicle automatic charging station 100 of the present invention and its various structural components may be of any shape, size, color and style that ensures optimal performance during use and/or that suits user need and/or preference.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A charging station for an electric vehicle, the charging station comprising:
   a docking station having a first tire guide and a second tire guide, wherein each of the first and second tire guides include a tire stop and a ramp;
   a charging receptacle disposed on a front end of the docking station, the charging receptacle having a connector for connecting to a charge port of an electric vehicle and a spring-loaded weatherproof cover configured to automatically open when the electric vehicle drives into the docking station;
   a pedestal including a display connected to the charging receptacle, the pedestal connected to the charging receptacle and for transferring an electrical power to the charging receptacle; and
   an indicator to show when charging of the electric vehicle has been completed; and
   wherein the charging receptacle is configured to automatically raise and lower to mate with the charge port of an electric vehicle.

2. The charging station for an electric vehicle as recited in claim 1, wherein the docking station is adjustable to accommodate a plurality of different wheel base dimensions.

3. The charging station for an electric vehicle as recited in claim 2, wherein the docking station is adjustable by a mechanism that moves in a scissor-like manner.

4. The charging station for an electric vehicle as recited in claim 2, wherein the docking station has a central connecting point.

5. The charging station for an electric vehicle as recited in claim 1, wherein the indicator further includes a timer, a battery charge capacity, an animation and at least one other user information.

6. The charging station for an electric vehicle as recited in claim 5, wherein the indicator comprises an analog display, a digital display, or a combination thereof.

7. The charging station for an electric vehicle as recited in claim 1, wherein each of the first and second tire guides include a tire sensor for determining a tire position within the first and second tire guides.

8. The charging station for an electric vehicle as recited in claim 1, wherein the charging receptacle can move in each of a transverse and a longitudinal direction to accommodate a plurality of different wheel base dimensions.

9. A charging station comprising:
   a docking station having a first tire guide and a second tire guide, wherein each of the first and second tire guides comprise a tire stop and a tire ramp, and further wherein the tire stops are located at a first end of the tire guides and the tire ramps are located at a second end of the tire guides;
   a receptacle movable in both a longitudinal direction and a transverse direction to accommodate a plurality of different vehicles' dimensions; and
   a pedestal having a display and providing information of an electric vehicle undergoing a charging in the docking station, wherein the pedestal is connected to a power source and distributes electrical power to the receptacle, and further wherein the docking station is adjustable about a connection point to accommodate a plurality of different wheel base dimensions; and
   wherein the charging station is configured to automatically adjust a charging cycle based on an individual identification code prior to the electric vehicle entering the docking station; and
   wherein the docking station is configured to optically sense the electric vehicle entering and exiting the docking station.

10. The charging station as recited in claim 9, wherein the display further includes a timer, a battery charge capacity, an animation and at least one other set of user information.

* * * * *